United States Patent [19]

Keller

[11] Patent Number: 5,509,751
[45] Date of Patent: Apr. 23, 1996

[54] SEAT ATTACHMENT APPARATUS

[76] Inventor: Jeff Keller, 138 E. 100, N. Logan, Utah 84321

[21] Appl. No.: 303,435

[22] Filed: Sep. 9, 1994

Related U.S. Application Data

[63] Continuation-in-part of Ser. No. 226,027, Apr. 11, 1994, abandoned.

[51] Int. Cl.$^6$ ........................................................ B62J 1/04
[52] U.S. Cl. ........................... 403/235; 403/389; 403/396; 297/215.15; 280/226.1
[58] Field of Search ................................. 280/220, 226.1, 280/283, 287; 297/215.15, 215.14; 248/219.2; 403/391, 390, 389, 396, 235, 241

[56] References Cited

U.S. PATENT DOCUMENTS

| | | |
|---|---|---|
| 333,128 | 12/1885 | Jeffery . |
| 548,306 | 10/1895 | Eller . |
| 549,466 | 11/1895 | Seaman . |
| 551,016 | 12/1895 | Ward . |
| 608,572 | 8/1898 | Bungay . |
| 4,142,813 | 3/1979 | Laborde ................................. 403/391 |
| 4,155,590 | 5/1979 | Cunningham ........................... 297/195 |
| 4,483,334 | 11/1984 | Murray ................................. 403/391 X |
| 5,190,346 | 3/1993 | Ringle ................................. 403/391 X |

FOREIGN PATENT DOCUMENTS

| | | |
|---|---|---|
| 1146981 | 11/1957 | France ..................................... 403/391 |
| 2616733 | 12/1988 | France ................................. 297/215.15 |
| 5662 | of 1893 | United Kingdom ................... 403/391 |
| 2939 | of 1893 | United Kingdom ................... 403/391 |
| WO93/08069 | 4/1993 | WIPO ............................... 297/215.15 |

Primary Examiner—Anthony Knight
Attorney, Agent, or Firm—Thorpe North and Western

[57] ABSTRACT

An apparatus for attaching a seat to a seat post comprises a cylindrical housing with oppositely oriented openings on the side of the housing. Top and bottom clamping pieces are positioned through the openings. Mating grooves on the ends of the clamps are adapted for placement and securing of a pair of rails affixed to the underside of the seat. A bottom block is disposed beneath the clamps and adapted for abutment against the clamps. The interior bottom portion of the housing is threaded, and the exterior top portion of the seat post is threaded for engagement with the threads of the housing, so that the seat post itself is tightened against the bottom piece, thus securing the seat rails within the clamps without need for tools or small components.

40 Claims, 6 Drawing Sheets

SEAT ATTACHMENT APPARATUS

BACKGROUND INFORMATION

This is a continuation-in-part application of U.S. patent application Ser. No. 08/226,027 filed on Apr. 11, 1994 now abandoned.

FIELD OF THE INVENTION

The present invention relates to an apparatus for attaching a seat to a seat post or frame, particularly bicycle seat posts and frames.

BACKGROUND OF THE INVENTION

Most bicycle seat assemblies have two rails extending underneath the seat from back to front, to which the post attaches and tightens by means of variously shaped housings and tightening bolts. The post in turn is placed in the bicycle frame, and adjusted vertically by sliding the post up or down within the frame. It is adjusted forwardly and rearwardly by loosening the attachment of the post to the rails and moving the rails through the post attachment forwardly or rearwardly as desired.

Prior art seat/post attachments, especially those with tilting capability, often employ numerous small parts which constitute a weakness in construction. Besides making the apparatus more complex and thus expensive, small parts such as bolts can and often do fail due to improper assembly, e.g. overtightening, poor maintenance, or simply fatigue induced through work hardening. The use of bicycles in the mountains and on other types of rugged terrain puts increased stress on these bolts and other components of the seat/post connection apparatus.

Another problem with seat/post attachment apparatus is complexity of adjustment. Retailers attempting to adjust a bicycle's seat position for a customer must often fiddle with numerous pieces at one time and use a correctly sized Allen wrench or similar tool. Since the seat/post attachments are difficult to adjust, many customers take delivery of bicycles that are not correctly adjusted for their physiques, resulting in inefficient and uncomfortable riding, and this increases the likelihood of fatigue and failure of small parts.

An additional concern with seat post apparatus arises as a result of some newly enacted safety standards in some countries for the devices. In particular, these standards require that the seat post connection withstand a certain force applied to either end of the seat without the connection rotating.

Thus, there is a need for a seat/post connection which minimizes the number of parts, and is easily adjustable.

OBJECTS AND SUMMARY OF THE INVENTION

It is an object of the invention to provide a seat/post attachment apparatus whose construction is relatively simple and which is relatively quick and easy to adjust.

It is another object of the invention to provide a seat/post attachment apparatus which uses relatively few components.

It is a further object of the invention to provide a seat/post attachment apparatus which minimizes or eliminates the need for small bolts or other hardware for securing the attachment apparatus to the seat.

It is a further object of the invention to provide a seat/post attachment apparatus which is less likely to break or otherwise fail.

It is an additional object of the invention to provide a seat/post attachment apparatus which minimizes or eliminates the need to use tools for position adjustment.

It is a further object of the invention to provide a seat/post attachment apparatus which is relatively lightweight.

It is still another object of the invention to provide a seat/post attachment apparatus which minimizes or eliminates the risk of accidental rotation while the seat is in use.

In accordance with one aspect of the invention, a seat attachment apparatus, adapted for use with a seat including an attachment member, includes a housing, an elongate seat post having first and second ends, the first end being engaged with and adapted for rotational movement within the housing, such that rotation of the seat post causes the seat post to move into or out of the housing, a clamp assembly, adapted for selective engagement of the attachment member, disposed within the housing, and a connector selectively connecting the seat post to the clamp assembly such that the movement of the seat post relative to the housing causes the clamp assembly selectively to engage and disengage the attachment member.

In accordance with another aspect of the invention, a locking device may be provided to limit the relative rotation of the seat post and the housing. In accordance with yet another aspect of the invention, a quick release mechanism is provided to obviate the need of rotating the seat post.

BRIEF DESCRIPTION OF THE DRAWINGS

These and other objects, aspects, and embodiments of the present invention will be described below with reference to the attached drawing figures, of which.

DETAILED DESCRIPTION OF THE INVENTION

Figure 1:
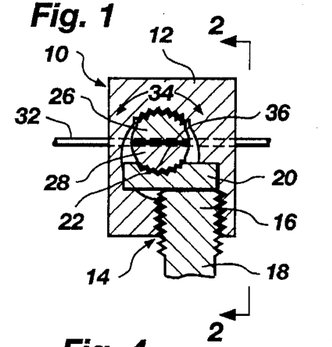
FIG. 1 is a side elevational view in cross section of an example of a bicycle seat/post attachment apparatus according to the invention.
Figure 2:
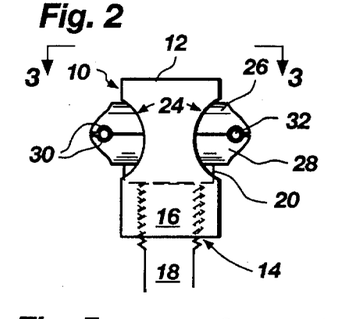
FIG. 2 is a view along line 2—2 in FIG. 1.
Figure 3:
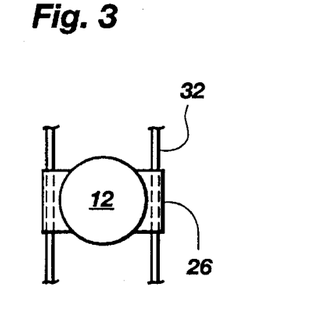
FIG. 3 is a view along line 3—3 in FIG. 2.

FIGS. 1 through 3 show an example of a bicycle seat/post attachment apparatus according to the invention which comprises a hollow cylindrical housing 10 with a closed top 12 and an open bottom 14. The housing need not necessarily be cylindrical, although a cylindrical shape is preferred for placement between seat rails. The housing top 12 can be open, if desired. The interior lower portion of the housing 10 is threaded in order to engage the threaded top portion 16 of a seat post 18 which can be screwed into or out of the housing 10. A generally cylindrical block or connector or contact piece 20, having a curved depression 22 at its top, is adapted for placement, depression side up, within the housing 10 on top of the seat post 18. The block may be constructed of metal alloy or other conventional material, but alternatively may be constructed of other materials such as thermoplastics, or composites.

Two openings 24 are disposed opposite each other in the sides of the housing. Two clamps 26 and 28 are placed in the housing on top of the block 20 and through the openings 24. Each clamp 26 and 28 has a generally half-cylindrical shape with a curved side and a flat side so as to form an approximate cylinder when flat sides are placed together. This cylinder is positioned approximately perpendicular to the cylindrical housing 10 and through the openings 24 when the clamps 26 and 28 are positioned inside the housing.

Grooves 30 are provided on the flat side, near the ends, and perpendicular to each clamp 26 and 28 so as to be disposed outside the housing cylinder when the clamps are in place. The grooves accommodate the seat rails 32 when the seat post is attached to the seat. The seat rails 32 are tightened, i.e., squeeze gripped or engaged, between the clamps 26 and 28 by screwing the seat post 18 into the housing 10. As the seat post 18 is screwed in a direction into the housing it urges the block 20 against the bottom clamp 28, the block 20 thus operationally connecting the clamp 28 to the seat post 18. As the top clamp 26 abuts the top 12 of the housing, the clamps are forced together, engaging the seat rails 32 and securing them against movement between the clamps. The top 12 of the housing acts as an opposer to the force and movement of the seat post, forcing the clamps together therebetween.

As shown in embodiments described below, the seat post may be operationally connected to the clamps in various ways, e.g., it is not necessary to have the seat post directly beneath or adjacent the clamps. The clamps may be attached or keyed together or to the housing to minimize lengthwise sliding movement, if desired.

As can be seen from the above description, the present invention provides for securing of the seat rails between the clamps of the attachment apparatus by means of rotating the seat post itself relative to the seat rails and thus the seat, instead of rotating a smaller bolt which requires a tool and which has a greater risk of breaking or failing. As a practical matter, it is contemplated that the operator will rotate the seat instead of the post while the latter is locked into the bicycle frame, correspondingly rotating the seat rails, and tightening or loosening the clamps. The relative rotational motion between the rails and the post remains the same whichever one is rotated. If the seat is not positioned at a desired angle when the apparatus is tightened, i.e., straight forward relative to the frame, the post may be,loosened within the frame and rotated together with the seat to adjust the latter's position.

The seat may be adjusted forwardly or rearwardly by unscrewing the seat post 18 out of the housing 10 slightly and thus allowing the rails to slide forward or rearward by loosening the clamps 26 and 28. The seat post 18 is then again tightened against the block 20. The seat also has tilting adjustment capability by unscrewing the seat post slightly to allow rotational motion of the clamps inside the housing, as shown by the arrows 34 in FIG. 1. The rotational motion of the clamps causes the seat to tilt up or down, as desired, after which the seat post 18 is again screwed into the housing 10 to tighten the clamps into position.

As shown in FIG. 1, serrations 36 may be formed on the interior of the top of the housing 12, the curved top 22 of the block, and on the curved sides of the clamps 26 and 28 to help maintain the rotational position of the clamps when tightened. Alternatively, one or more of the surfaces may be roughened, etched or constructed of hardened rubber or other high friction, gripping material. Some shock dampening would occur with the use of rubber in this context, as well as between the clamp grooves 30. A screen grit paper alternatively could be placed between the clamps and their abutting surfaces for increased friction. These alternative designs have the advantage of allowing for infinite rotational positions of the clamps and reduction of cost as well as elimination of serration wear.

In the preferred embodiment, the apparatus components generally are constructed of carbon composites, aluminum, titanium, steel, or a similar metal or alloy except for possible high friction surface materials. However, other materials and composites may be used.

The use of clamps of a modified design from those described herein will be apparent to those skilled in the art in light of this disclosure. If tilting adjustment capability is not desired, for example, the clamps can be rectangular or other shape in cross section, and one clamp may be attached or made unitary with the housing itself, effectively creating a single clamp operating together with the housing.

Figure 4:
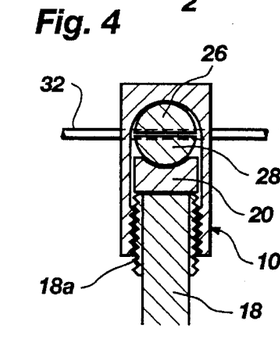
FIG. 4 is a side elevational view in cross section of an example of a bicycle seat/post attachment apparatus according to the present invention with a modified seat post.

Referring to FIG. 4, a preferred alternative of the construction of the seat post is shown. Instead of threading the seat post 18 itself (shown in FIGS. 1–3), a hollow cylindrical threaded sleeve 18a is placed over and bonded, welded, press fitted, or otherwise secured to the top portion 16 of the seat post. By this means the seat post itself may be constructed of a lighter and/or thinner-walled aluminum alloy composites, titanium or similar material while constructing the sleeve 18a of a heavier material such as steel which can streamline tooling and machining and therefore cost less. In addition, steel threads will be less likely to gall or otherwise fail, though in practice galling threads may be beneficial in acting as a locking mechanism. The sleeve may include a collar for abutment against the housing for use in certain embodiments of the invention described below. Another method would be to roll threads into the end of the seat post 18 in a matter known to those skilled in the art.

The seat post is slightly offset from the housing 10 (FIGS. 1–3) or the seat post may be centered directly into the housing 10 (FIG. 4).

Figures 5, 6:
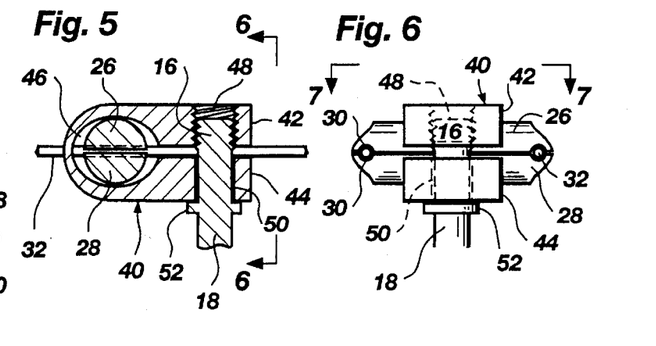
FIG. 5 is a side elevational view in cross section of an example of a bicycle seat/post attachment apparatus according to the present invention with the clamps offset from the seat post in a pinch-type housing.
FIG. 6 is a view along line 6—6 in FIG. 5.
Figures 7, 7A, 8:
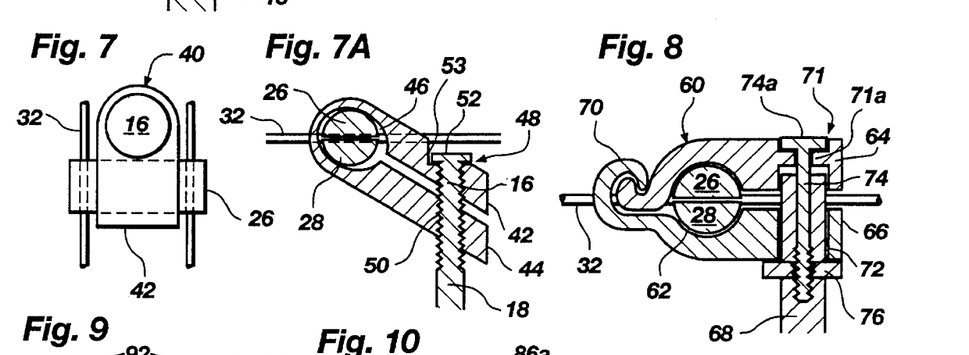
FIG. 7 is a view along line 7—7 in FIG. 6.
FIG. 7A is a side elevational view in cross section of a bicycle seat/post attachment apparatus similar to that of FIG. 5 but with/a tilted housing and with the lower arm of the housing threaded and with a collar on the upper arm.
FIG. 8 is a side elevational view in cross section of a bicycle seat/post attachment apparatus using a joined two-piece housing and a nut/bolt post attachment assembly.

Referring now to FIGS. 5 through 7, another embodiment is shown which differs principally from the embodiments shown in FIGS. 1–4 in that the seat post is completely offset from the clamps and tightens them around the seat rails in a different way. A housing 40 is C-shaped with arms 42 and 44 and a hollow 46 at the juncture of the arms for the positioning of the clamps 26 and 28 therein. The arms 42 and 44 are relatively thick in a preferred embodiment, but may be of any appropriate thickness.

The hollow 46 is horizontally oriented and generally cylindrical with an oval cross section. The clamps 26 and 28 are positioned within the hollow 46 in the same orientation as in FIGS. 1–4, and the seat rails 32 run through the grooves 30 formed in the clamps.

The hollow 46 is shaped ovally to enable movement of the clamps therein when they are loosened for accommodation of the seat rails 32 when the seat rails are adjusted or installed. An oval cross-sectional hollow shape is not critical to operation of the invention. Other means of allowing the clamps to spread apart adequately to install or adjust the seat rails can be used, as will be apparent to those skilled in the art in light of this disclosure. For example, the hollow may have a curvilinear shape on one side, where the clamps abut the housing, and a rectilinear shape on the other, where a block or other device may be placed after installation or adjustment to keep the clamps in position.

As the arms 42 and 44 of the housing are urged together, the hollow 46 closes in on the clamps 26 and 28, urging them together and tightening the seat rails 32 between them, securing the seat in position.

Each arm 42 and 44 has a vertically-oriented cylindrical hole 48 and 50, respectively, running therethrough for the positioning of the seat post 18 therein. The hole 48 in the upper arm 42 is threaded for engagement with threads on the upper portion 16 of the seat post, while the hole 50 in the lower arm 44 is not threaded and is slightly larger in diameter than the seat post 18 such that the latter may slidably move therein. A flange or collar 52 is bonded or otherwise secured to the seat post 18 below the upper portion 16 such that it abuts the bottom surface of the lower arm 44 when the upper portion 16 of the seat post is threadedly engaged in the hole 48. As mentioned above, the collar may be part of a sleeve placed around the top portion of the seat post.

The collar 52 can be a snap ring or other removable abutting apparatus to enable entry of the post into the housing through the top arm 42. Preferably, the portion of the post passing through the hole 50 closely approximates the diameter of the hole for a tight fit. A sleeve may be placed over the post to thicken it in the hole 50, if needed.

As the upper portion 16 of the seat post is screwed into the hollow 48, the collar 52 abuts the lower arm 44 and forces the arms 42 and 44 together, urging the clamps 26 and 28 together and tightening the seat rails 32 between them.

To adjust the seat forwardly or rearwardly the seat post is unscrewed from the housing 40 slightly and the seat rails 32 are moved forwardly or rearwardly through the grooves 30. To tilt the seat the seat post is unscrewed slightly from the housing 40 and the clamps 26 and 28 are rotated within the hollow 46. The clamps and adjacent surfaces may be serrated or otherwise constructed to prevent rotation when tightened.

The clamps 26 and 28 are offset from the seat post 18 in part to enable the housing 40 to be rotated around the seat post 18 such that the clamps 26 and 28 are forward or rearward of the seat post for corresponding position changes of the seat. In certain riding conditions, a rider sometimes needs the seat to be adjusted substantially forward or backward. Since adjustment of the described apparatus does not require tools, adjustment may be made relatively easily even during a ride if condition changes require it.

It can be seen that the arms 42 and 44 of the housing serve to operationally connect the movement of the seat post to the clamps, which in turn responsively tighten upon or loosen the seat rails. If no tilting adjustment capability is desired, the clamps may be modified and/or attached to the housing itself.

FIG. 7A shows a variation on the embodiment shown in FIGS. 5 through 7. In this embodiment, the holes 48 and 50 extend through the arms 42 and 44 at an angle and causes the connection of the seat post to the housing to be under instead of between the seat rails, allowing more room for the use of larger and/or thicker components to increase strength. The hole 50 in the lower arm is threaded for engagement with the threaded top portion of the seat post 18, and the hole 48 in the upper arm is slightly larger in diameter than the seat post for sliding engagement therewith. A collar or flange 52 is disposed on the top of the seat post and abuts the top of the upper arm 42 in a leveled portion 53. When the seat post is threaded downwardly through the lower arm 44, the collar 52 presses against the top arm 42 and urges the arms together, tightening the clamps 26 and 28 in the hollow 46 and against the seat rails 32. When the seat post is threaded upwardly, the clamps are loosened. The collar 52 may be made part of a threaded sleeve fitting over the seat post itself (basically a reversal of the function of holes 48 and 50 in FIGS. 5–7).

It can be seen in FIG. 7A that the oblong shape of the hollow 46, if oriented parallel to the arms, may cause the clamps to slide relative to each other instead of gripping the seat rails. This effect can be obviated by orienting the hollow in a different direction, or placing a block therein after installation or adjustment of the seat rails to guard against undesired movement.

FIG. 8 shows another example of the invention. The housing 60 is similar to the housing 40 in FIGS. 5 through 7, except that the hollow 62 for positioning of the clamps 26 and 28 is cylindrical or nearly so, not ovally shaped, and the housing 60 is not a unitary piece. Rather, the arms 64 and 66 are separate pieces which engage each other by a hinge 70 on the side of the hollow 62 opposite the seat post 68. An ovally-shaped hollow is not needed to give the clamps room to move during adjustment or assembly since the arms 64 and 66 may be moved apart as much as is needed to accommodate movement of the clamps when they are spread or separated for assembly or installation of the seat rails. Instead of a hinge, the arms 64 and 66 may be attached by screws or other suitable means, if desired.

The holes 71 and 72 through the arms 64 and 66, respectively, are similar to the holes 48 and 50 in FIGS. 5 through 7A except that neither hole is threaded. Additionally, housing abutments 71a extend into the hole 71. A bolt 74 extends through the top of the seat post's hollow interior. In a preferred embodiment, the bolt's head 74a, disposed on top of the arm 64 against the abutments 71a, is of a rectangular or hexagonal shape with the top of the hole 71 having a similar shape to key in the bolt head 74a to guard against rotational movement when the bolt is in place or, the bolt head can be pinned to maintain position. The top of the seat post is disposed below the abutments 71a oppositely the bolt head 74a. A cylindrical rod 76 runs laterally through a corresponding hole in the seat post 68, positioned such that it abuts the bottom surface of the arm 66 when the seat post is tightened against the arms. The bolt 74 is threaded and screws through a correspondingly threaded hole in the rod 76, causing the latter to act as a nut in a fixed position with the post.

With the bolt 74 threaded through the rod 76 and keyed into position at the top of the arm 64, the seat post 68 can be rotated causing the bolt 74 to screw down into the rod or nut 76 and urging the arms together by the pressure of the bolt head 74a and the rod 76 against the upper arm 64 and the lower arm 66, respectively. This action urges the clamps 26 and 28 together, gripping or tightening the seat rails 32 between them. Rotation of the seat post in the opposite direction causes the clamps to loosen. This bolt and nut system could be used in other embodiments, e.g., the embodiment shown in FIGS. 5 through 7.

Figure 9:
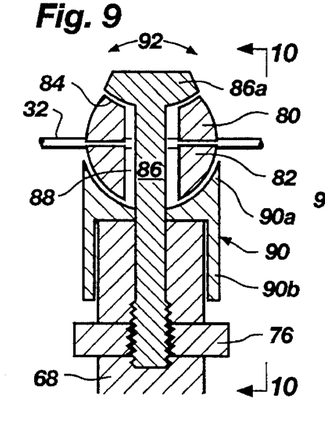
FIG. 9 is a side elevational view in cross section of a bicycle seat/post attachment apparatus without a housing.
Figures 10, 11:
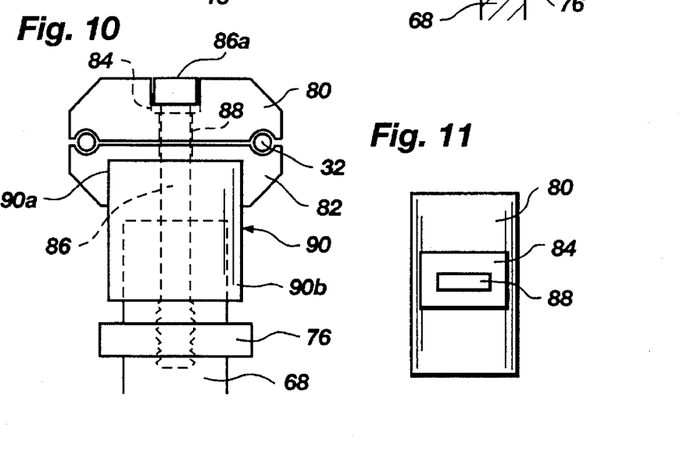
FIG. 10 is a view along line 10—10 in FIG. 9.
FIG. 11 is a top plan view of the upper clamp in FIG. 9.

FIGS. 9 through 11 show another example of a bicycle seat/post attachment apparatus. Clamps 80 and 82 are oriented as are the clamps 26 and 28 in previously described embodiments, but differ in that a curved depression 84 is formed in the top clamp 80, into which depression fits the head 86a of a bolt 86. The bolt head 86a has a curved bottom surface which corresponds to the curvature of the depression 84, enabling sliding movement therebetween. The body of the bolt 86 extends through a slot 88 formed through both clamps 80 and 82 into the seat post 68. A cradle 90 is disposed between the clamp 82 and the top of the seat post 68. The cradle has a curved top portion 90a corresponding to the curvature of the bottom clamp 82, allowing for sliding movement therebetween, and a recess 90b at its bottom into which the top of the seat post 68 extends. The recess 90b provides only for rotational movement of the seat post within the cradle 90, and serves to prevent the clamps from slipping off the top of the post. A rod 76 is disposed through the seat post 68 in threaded engagement with the bolt 86.

To tighten the clamps 80 and 82 against the seat rails 32, the seat or seat post is rotated, causing the bolt 86 to screw into the rod 76 and urging the clamps 80 and 82 together between the bolt head 86a and the cradle 90, tightening the seat rails 32 therebetween. To adjust the seat rails longitudinally, the seat post is rotated the opposite direction, loosening the clamps and allowing the seat rails to slide forwardly or backwardly. To tilt the seat, the seat post is rotated in the loosening direction and the clamps are rotated in the direction of either arrow 92 shown in FIG. 9. The curved interfaces between the bolt head 86a and the top clamp 80 and between the top portion 90a of the cradle and the bottom clamp 82 allow the rotational movement, while the slot 88 allows for the corresponding lateral movement of the body of the bolt 86. It will be apparent to those skilled in the art that the rotational movement limit of the clamps will be the length of the slot, since rotational movement will be prevented when the bolt reaches the end of the slot.

The bolt head 86a acts as an opposer to the movement of the seat post 68 with the fixed rod nut 76, the seat post and rod and bolt head serving to tighten or loosen the clamps therebetween.

Figure 12:
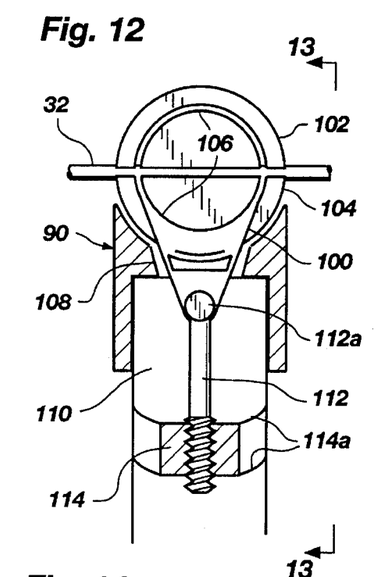
FIG. 12 is a side elevational view in cross section of a bicycle seat/post attachment apparatus using a band and bolt for engagement of the clamps.
Figure 13:
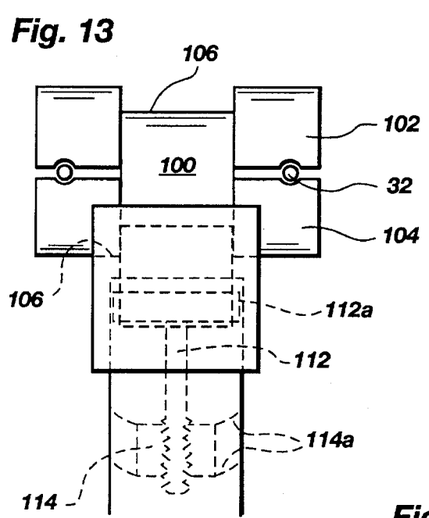
FIG. 13 is a view along line 13—13 in FIG. 12.

Referring now to FIGS. 12 and 13, another example of an apparatus according to the invention is shown which uses a flat, elongate flexible band 100 to tighten the clamps 102 and 104 together. The band, constructed of suitable flexible and strong material such as stainless steel is disposed within a groove 106 disposed around the clamps 102 and 104, through apertures 108 in the cradle 90, and into the open top end of the seat post 110. Alternatively, the apertures 108 may be replaced by a simple hole large enough to accommodate the band. The ends of the band 100 overlap each other in the seat post 110, each end of the band having a hole disposed therein for the passage therethrough of a T-bolt 112. The threaded lower end of the T-bolt 112 engages a star washer nut 114 secured within the seat post 110. The nut 114 has flanges 114a extending from the body of the nut which secure it in position within the seat post.

To secure the seat rails 32 between the clamps 102 and 104, the seat post is rotated, causing the T bolt 112 to screw into the star washer 114 and tightening the band 100 around the clamps 102 and 104, urging them together and against the cradle 90. To adjust the seat rails 32, the seat post is rotated in the opposing direction to loosen the band and clamps, after which the seat rails are slid to the desired position. To tilt the seat, the clamps are again loosened and rotated in the desired direction, after which they are again tightened.

Figure 14:
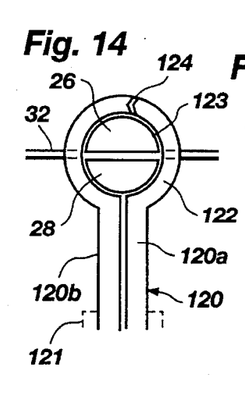
FIG. 14 is a side elevational view in cross section of a bicycle seat/post attachment apparatus using a split seat post.

Referring now to FIG. 14, another embodiment is shown in which the seat post 120 is split generally longitudinally into two halves or arms 120a and 120b. While the seat post is in position the arms are maintained together by the bicycle frame 121. The arms culminate in a generally cylindrical top section 122 defining a hollow or cavity 123 in which the clamps 26 and 28 are positioned. The arms may be hinged by a hinge 124 at their top or otherwise be constructed such that they can be taken out of the bicycle frame 121 and spread far enough apart to allow the clamps 26 and 28 to loosen enough to install and adjust the seat rails 32 therein.

After the seat rails 32 are placed between the clamps, the arms 120a and 120b of the seat post are brought together, tightening the seat rail between the clamps, and the seat post is inserted into the bicycle frame 121. To adjust the seat, the seat post is taken out of the bicycle frame 121 and the arms 120a and 120b are spread apart, loosing the clamps and allowing the seat rails to be moved forwardly or backwardly or allowing the clamps to be rotated to tilt the seat. The seat post is then reinserted into the bicycle frame 121.

Figure 15:
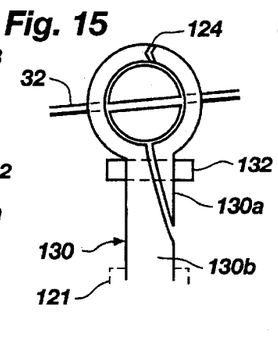
FIG. 15 is a side elevational view in cross section of another example of a bicycle seat/post attachment apparatus using a split seat post.

An alternative method of splitting the seat post is shown in FIG. 15, which shows a seat post 130 split diagonally down its length, resulting in a short arm 130a and a longer arm 130b. The arms are maintained together not by insertion into the bicycle frame but by a collar 132 which is removed for spreading of the arms to adjust the seat and reinstalled to tighten the seat rails between the clamps. The collar may be of a quick-release type, if desired. Thus the need to remove and insert the entire seat post into the bicycle frame 121 as in FIG. 14 is eliminated.

Figure 16:
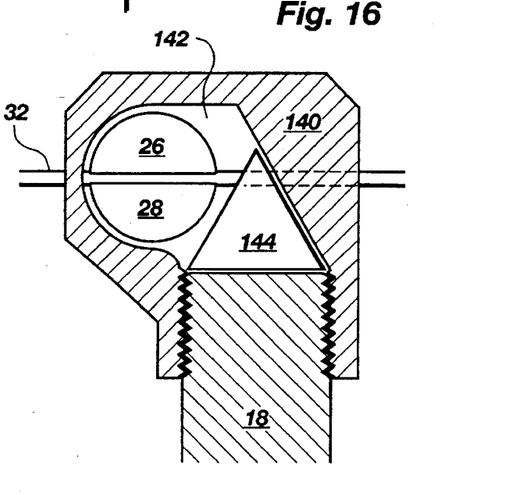
FIG. 16 is a side elevational view in cross section of a bicycle seat/post attachment apparatus using a wedge on top of the seat post.

Referring now to FIG. 16, another embodiment is shown which comprises a unitary housing piece 140 which contains a chamber 142 for placement of clamps 26 and 28. A seat post 18 threads into the bottom of the housing 140 in an offset position from the clamps, and a wedge 144 is disposed on top of the seat post 18 and adjacent the side of the clamps. The wedge may be conical or multi-faceted, as desired. To tighten the seat rails 32 between the clamps 26 and 28, the seat post 18 is screwed into the housing 140, urging the wedge 144 up and to the side and consequently urging the clamps together. To adjust the seat, the seat post is screwed downwardly, the adjustment is made, and the apparatus is retightened.

Figure 17:
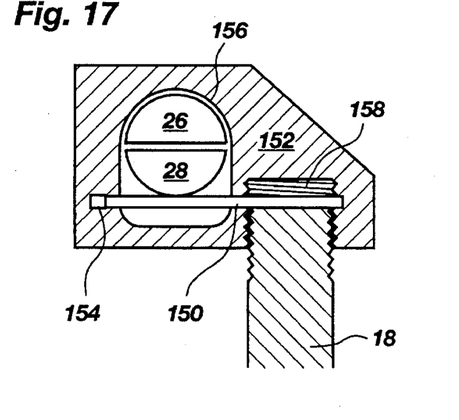
FIG. 17 is a side elevational view in cross section of a bicycle seat/post attachment apparatus using a lever to connect the seat post with the clamps.

Referring now to FIG. 17, another example of an apparatus according to the invention is shown which uses a lever 150 to tighten the clamps. The lever 150 is disposed within a housing 152 and anchored at a point 154 away from the seat post 18. Clamps 26 and 28 are disposed in a chamber 156 above the lever 150. The seat post threadedly engages a recess 158 in the housing, the recess being offset from the chamber 156, and the end of the lever 150 opposite the anchor point 154 extends into the recess. As the seat post 18 screws into the recess 158, it abuts the lever and urges it against the clamps, urging them together and tightening the seat rails. The lever 150 thus operationally joins the seat post to the clamps, the movement of the former causing the latter selectively to engage and disengage the seat rails.

The lever may be straight, as shown in FIG. 17, or curved or otherwise modified as will be apparent to those skilled in the art in light of this disclosure.

Figure 18:
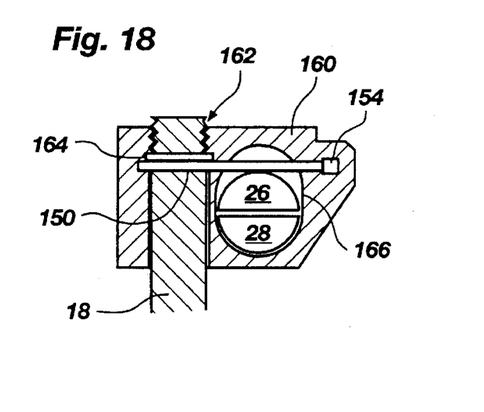
FIG. 18 is a side elevational view in cross section of another example of a bicycle seat/post attachment apparatus using a lever.

FIG. 18 shows an example of the present invention similar to that shown in FIG. 17 except that upward movement of the seat post loosens the clamps instead of tightening them. The housing 160 in FIG. 18 has a recess 166 for placement of the seat post 18. The lever 150 is attached to an anchor point 154 away from the clamps 26 and 28 in a recess 162 in the housing. The seat post 18 is disposed in the recess 162, and has a collar 164 below its threaded top portion.

The lever is disposed beneath the collar 164 on the seat post, whereby downward movement of the seat post causes the lever to urge the clamps together, tightening the seat rails between them. Upward movement of the seat post loosens the clamps for adjustment.

The collar 164 is not necessary if alternative means are used to press the lever, including making the threads themselves wider than the rest of the seat post.

Figure 19:
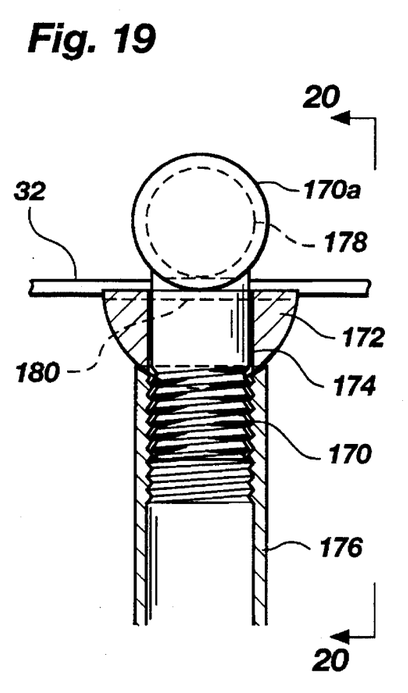
FIG. 19 is a side elevational view in cross section of another example of a bicycle seat/post attachment apparatus using a grooved bolt head and a male threaded bolt body.
Figure 20:
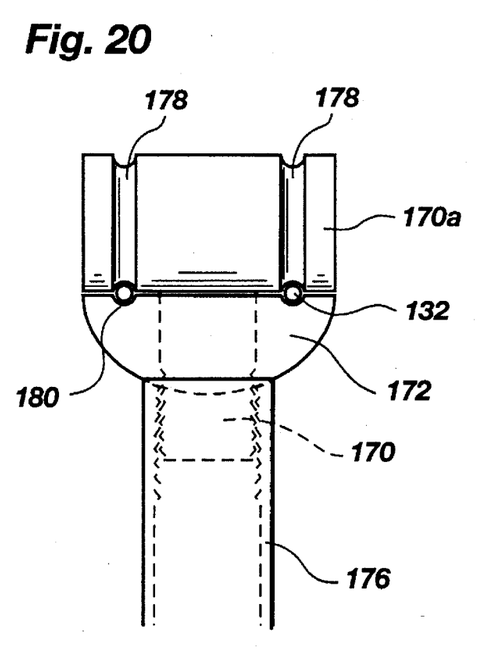
FIG. 20 is a view along line 20—20 in FIG. 19.

FIGS. 19 and 20 show an embodiment using a grooved cylindrical bolt head 170a and threaded bolt body 170. In this embodiment, the bolt head 170a acts as a top clamp working together with a bottom hemispherical clamp 172 having a slot 174 disposed downwardly therethrough for accommodation of the bolt body 170. The clamp 172 is disposed directly on top of the seat post 176 and can rotate or tilt relative thereto by reason of its hemispherical shape. The seat rails 32 are disposed in grooves 178 formed in the sides of the bolt head 170a and which wrap around it, and grooves 180 in the flat portion of the clamp 172. The slot 174 is wider than the bolt body 170 for accommodation of the latter when the clamp 172 is tilted. The seat post 176 is interiorly threaded and in threaded engagement with the bolt body 170, which is exteriorly threaded. Rotation of the seat post 176 relative to the bolt 170 causes the bolt head 170a to tighten against or loosen from the seat rails 32 and clamp 172 for adjustment of the seat rails or for tilting of the clamp. When the clamp 172 is tilted, the seat rails 32 remain within the grooves 178 of the bolt head 170a because of the circular shape of the grooves.

Figure 21:
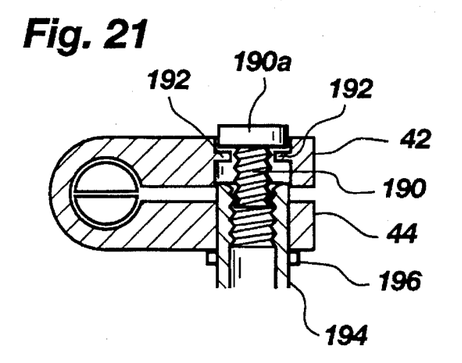
FIG. 21 is a side elevational view in cross-section of an embodiment using an interiorly threaded seat post in conjunction with an exteriorly threaded bolt.

The interior threading of the seat post mating with the exterior threading of the bolt can be used in other embodiments herein. For example, referring to FIG. 21, it may be used in a modified version of the embodiment in FIG. 5. A bolt 190 with a head 190a is disposed through the top arm 42 of the housing and the head 190a abuts the top arm 42 at points 192. The bolt is exteriorly threaded for engagement with the interiorly threaded seat post 194. A flange or collar 196 is disposed around the seat post and abuts the bottom arm 44. In a preferred embodiment, the bolt head 190a is keyed into the top arm 42 for prevention of rotational movement of the head 190a. When the seat post 194 is rotated relative to the bolt 190, the bolt head 190a and the collar 196 are brought closer together or taken farther apart, respectively urging the arms 42 and 44 together or allowing them to go apart. The interior threading of the seat post can be beneficial when dealing with limited spaces near the seat and between the seat rails.

Figure 22:
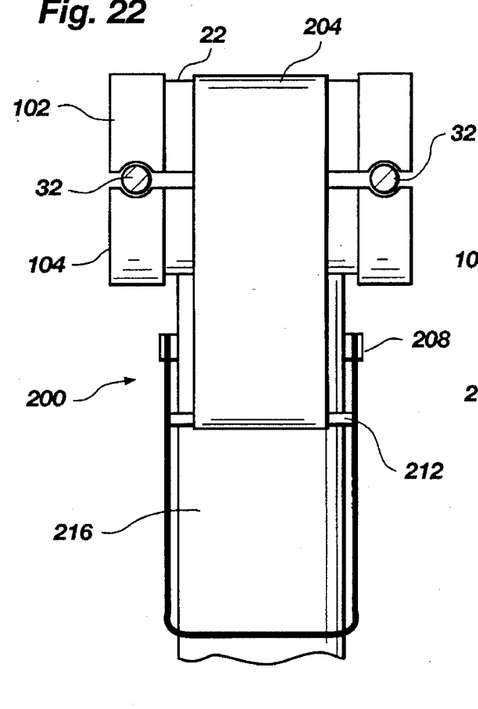
FIG. 22 is a elevational view of a quick release embodiment for adjusting the position and angle of the seat.
Figure 22A:
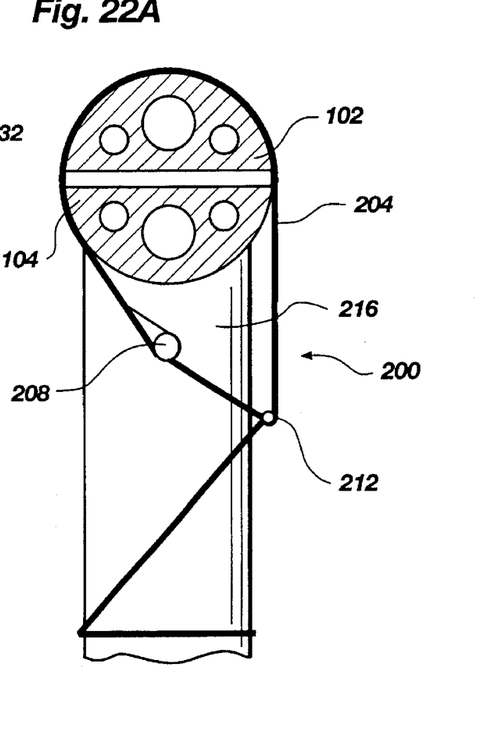
FIG. 22A is a side elevational view of the embodiment shown in FIG. 22, and showing a partial cross-section of the clamp means along the line 22 in FIG. 22.
Figure 22B:
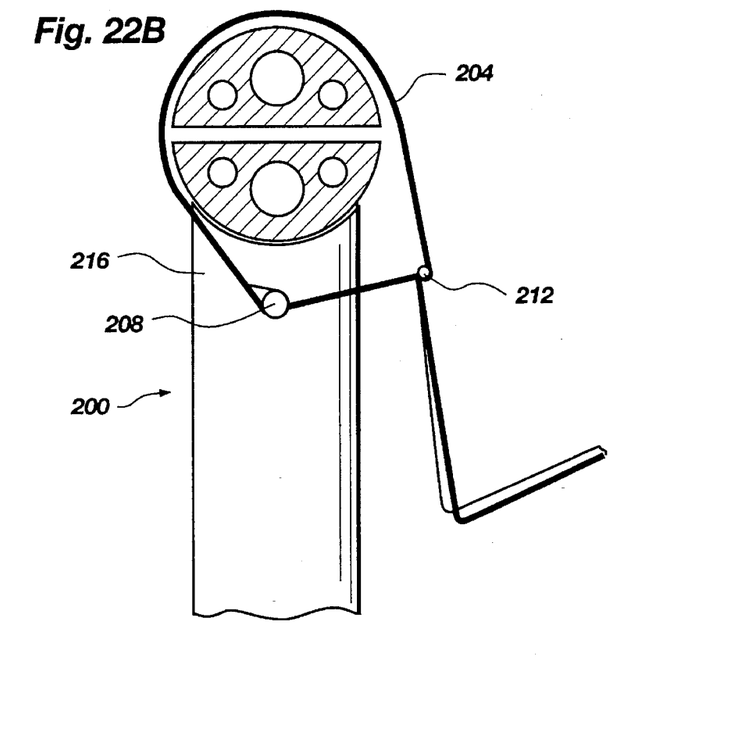
FIG. 22B is a side elevational view, in partial cross-section, of the embodiment shown in FIG. 22A, showing the embodiment in an open position.

Referring now to FIGS. 22, 22A and 22B, there is shown another embodiment of the present invention. The apparatus 200 is designed to enable quick release and securing of the clamps 102 and 104, to thereby enable quick adjustments to the seat angle, or the position of the seat relative to the seat post. As will be apparent, the clamps 102 and 104 are analogous to the clamps 102 and 104 in the embodiment shown in FIGS. 12 and 13, and are likewise held in a desired position by a band 204.

The band 204 is attached to a pivot point 208 at one end, and an adjustment clip 212 at an opposing end. As with the band 100 of the embodiment described regarding FIGS. 12 and 13, the band 204 can be made of metal or other durable materials. When the clip 212 is placed in a holding position (i.e., the clip rests against the seat post 216 as shown in FIGS. 22 and 22A) the band 204 holds the clamps 102 and 104 in fixed relation to the seat post, enabling the clamps to properly hold the seat, via the seat rails 32, in the position desired by the rider. FIGS. 22A and 22B show cross-sectional views of the clamps 102 and 104 taken along the line 22 to enable the band 204 to be seen.

By rotating the clip 212 about the pivot point 208, so that the clip swings away from the seat post 216 (as shown in FIG. 22B), the band 204 is loosened so that it no longer fits tightly about the clamps 102 and 104. When the band is loosened, the seat rails 32 may be slid relative to the clamps 102 and 104 to change the location of the seat, and/or the clamps may be rotated relative to the seat post 216 to change the angle of the seat (not shown). Once the desired angle or location of the seat has been achieved, the clip 212 is rotated about the pivot point 208 so as to be forced back against the seat post 216 (as shown in FIG. 22A), thereby tightening the band 204 and holding the clamps 102 and 104 in place.

The rotation of the clip 212 described above allows for almost instantaneous adjustment of the angle or position of the seat. Such rapid adjustment is particularly beneficial for cyclists who change terrain often, and therefor must frequently change seat position to maintain comfort and to achieve maximum power output and balance through proper positioning of the seat; and prevent injury.

Figure 23:
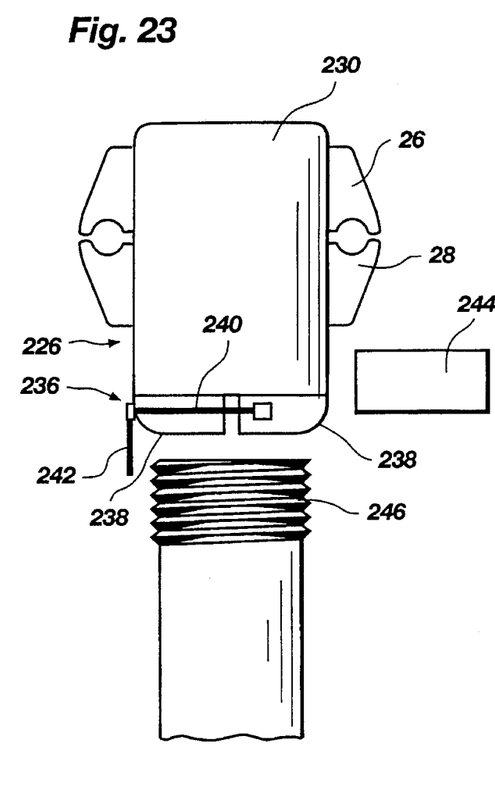
FIG. 23 is a partially exploded view of an embodiment in which the housing may be locked about the threaded stem to prevent rotation of the housing once the desired seat position has been obtained.
Figure 23A:
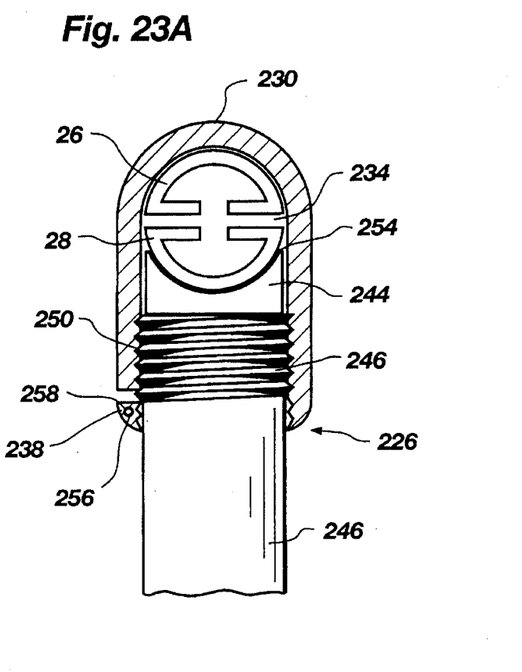
FIG. 23A is a side elevational view in cross-section of the embodiment shown in FIG. 23.

Referring now to FIG. 23, there is shown a partially exploded view of another embodiment of the present invention. The apparatus 226 shown includes a housing 230 similar to that shown in FIG. 2. The housing 230 may be made of any other durable, rigid material, but preferably is made of titanium, thermoplastics or aluminum alloys. The clamps 26 and 28 extend through a hollow portion 234 of the housing, as shown in FIG. 23A and similar to the embodiment discussed in detail regarding FIGS. 1 and 2. The base 236 of the housing 230 has two portions 238 which are spaced apart. The two portions 238 are connected by a quick release connector 240 of a type similar to those used on wheel hubs and which are well known in the art. By moving a lever 242 of the quick release connector 240, the two portions 238 are moved between a relaxed state in which they are spaced, and a locking state in which they are pulled toward each other. When the lever 242 is rotated so that the two portions 238 are pulled together, the pinching action of the two portions prevent the housing 238 from rotating relative to the seat post 246. When the lever 242 is rotated to release the two portions 238, it reenables rotation of the housing 230 relative to the seat post 246.

Also shown in FIG. 23 is a jam washer 244 and a threaded seat post 246. Typically, the jam washer 244 and the seat post 246 will be made of aluminum or steel, but either could be made of other materials. The functioning of the jam washer 244 is discussed below.

Referring now to FIG. 23A, there is shown an elevated side cross-sectional view of another embodiment of the apparatus 226. The threaded seat post 246 is inserted into the housing 230 so as to mate with threads 250 in the housing. As the threaded seat post 246 is rotated to move into the housing 230, it causes the clamps 26 and 28 to be compressed together, thereby holding seat rails (not shown) in a desired position as described in previous embodiments of the invention. If the seat (not shown) needs to be adjusted, the seat post 246 (or the housing 230) is rotated to move the seat post 246 away from the clamps 26 and 28 until grip of the clamps on the seat rails is loose enough to move the seat.

The jam washer 244 is positioned between the seat post 246 and the clamp 28 in order to provide a more secure fit between the clamp 28 and the seat post 246. Additionally, a concave surface 254, of the jam washer 244 which contacts the clamp 28 is usually serrated (or provided with a rough surface) to prevent the clamp from slipping or rotating relative to the seat post. Such an arrangement also allows the user to choose a particular angle for his or her seat by rotating the clamp 28 into the desired position before tightening the apparatus 226.

Once the apparatus 226 is in the desired position, the two portions 238 are pinched together to prevent further rotation. As shown in FIG. 23A, this is done by rotating a threaded bolt 256 to mate with threads 258 in the two portions 238, rather than rotating the lever 242 of the quick release connector 240 as shown in FIG. 23. As the base 236 of the housing 230 pinches together, the threads 250 of the housing and the threads of the seat post 246 will no longer move readily with respect to each other. If the bolt 256 is tightened sufficiently, the housing 230 and the seat post 246 are held fastly together. Thus, by tightening the lever 242 or bolt 256, the housing 230 (and thus the seat) is held firmly in place.

Figure 24:
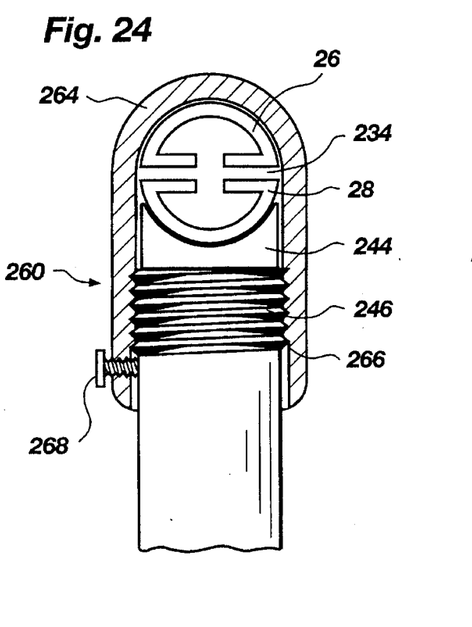
FIG. 24 is a side elevational view in cross-section of another embodiment in which the housing includes a set screw for selectively limiting relative rotation between the housing and the seat post.

Referring now to FIG. 24, there is shown another embodiment of the present invention. The apparatus 260 includes a housing 264 substantially similar to the housing 230 shown in FIGS. 23 and 23A. The primary difference between the housings is that housing 264 (FIG. 24) does not have a base 236 with a slit formed therein which can be tightened by a bolt 256 or lever 242, as is shown in FIGS. 23 and 23A, to tighten the threads of the housing about those of the seat post 246 and thereby prevent rotation of the housing about the seat post. Instead, a set screw 268 extends through the housing 264 so as to contact the seat post 246.

In use, the seat post 246 and housing 264 are adjusted relative to one another as was explained with respect to FIGS. 23 and 23A. Once the desired position is obtained, the set screw 268 is rotated so that it moves toward the seat post 246 until the set screw firmly contacts the seat post. When the set screw 268 is so tightened, the housing 264 and the seat post 246 can no longer rotate relative to one another due to the friction between the set screw and the seat post. Thus, the seat (not shown) supported by the housing 264 and clamps 26 and 28 will not rotate relative to the seat post without considerable force.

Alternately, a buffer pad, preferably made of a softer or smoothed material, could be placed between the set screw 268 and the seat post 246. Those skilled in the art will recognize that forcing the housing to turn with the set screw 268 against the seat post 246 will mar the seat post and could even lead to the seat post breaking.

Figure 25:
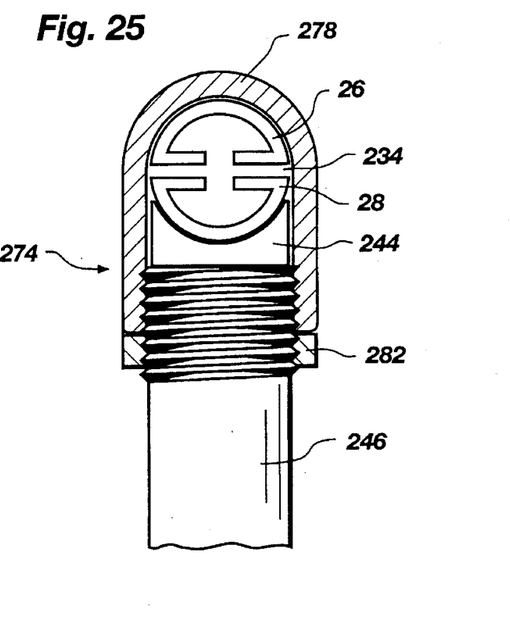
FIG. 25 is a side elevational view in cross-section of yet another embodiment of a housing/nut combination for selectively limiting rotation of the housing once a desired position has been achieved.

Referring now to FIG. 25, there is shown yet another embodiment of the locking aspect of the present invention. The apparatus 274 includes a housing 278 which is substantially similar to the housing 230 (FIGS. 23 and 23A) and housing 264 (FIG. 24). The primary difference with housing 278 is that it lacks a base 236 (FIG. 23) which may be pinched together with a lever 240 (FIG. 23) or a bolt 256 (FIG. 23A), and lacks a set screw 268 (FIG. 24). Instead, a nut 282 is positioned on the threaded seat post 246 below the housing 278. When the housing 278 and/or the seat post 246 has been rotated so the two clamps 26 and 28 are held in the desired position, the nut 282 is rotated so that it abutts firmly against the bottom of the housing. When the nut 282 is in this position, the force between the housing 278 and the nut 282 prevent the housing and/or nut from rotating about the seat post 246. Thus, a seat (not shown) connected to the housing 278 by the clamps 26 and 28 cannot be rotated when the nut 282 is tightened against the housing.

As was explained in the background section, it is desirable to limit rotation of the seat while a person is riding the bicycle. By using any of the methods discussed relative to the embodiments shown in FIGS. 23 through 25, the seat (not shown) can be held so that it will withstand significant lateral force to either end without turning. This makes the seat safer for the rider. As will be appreciated by those skilled in the art, these embodiments allow the seat to be held in position while retaining the simple adjustment and minimization of parts accomplished by the present invention. Those skilled in the art will recognize that the methods for limiting rotational movement can be used on most, if not all, of the embodiments disclosed herein.

Figure 26:
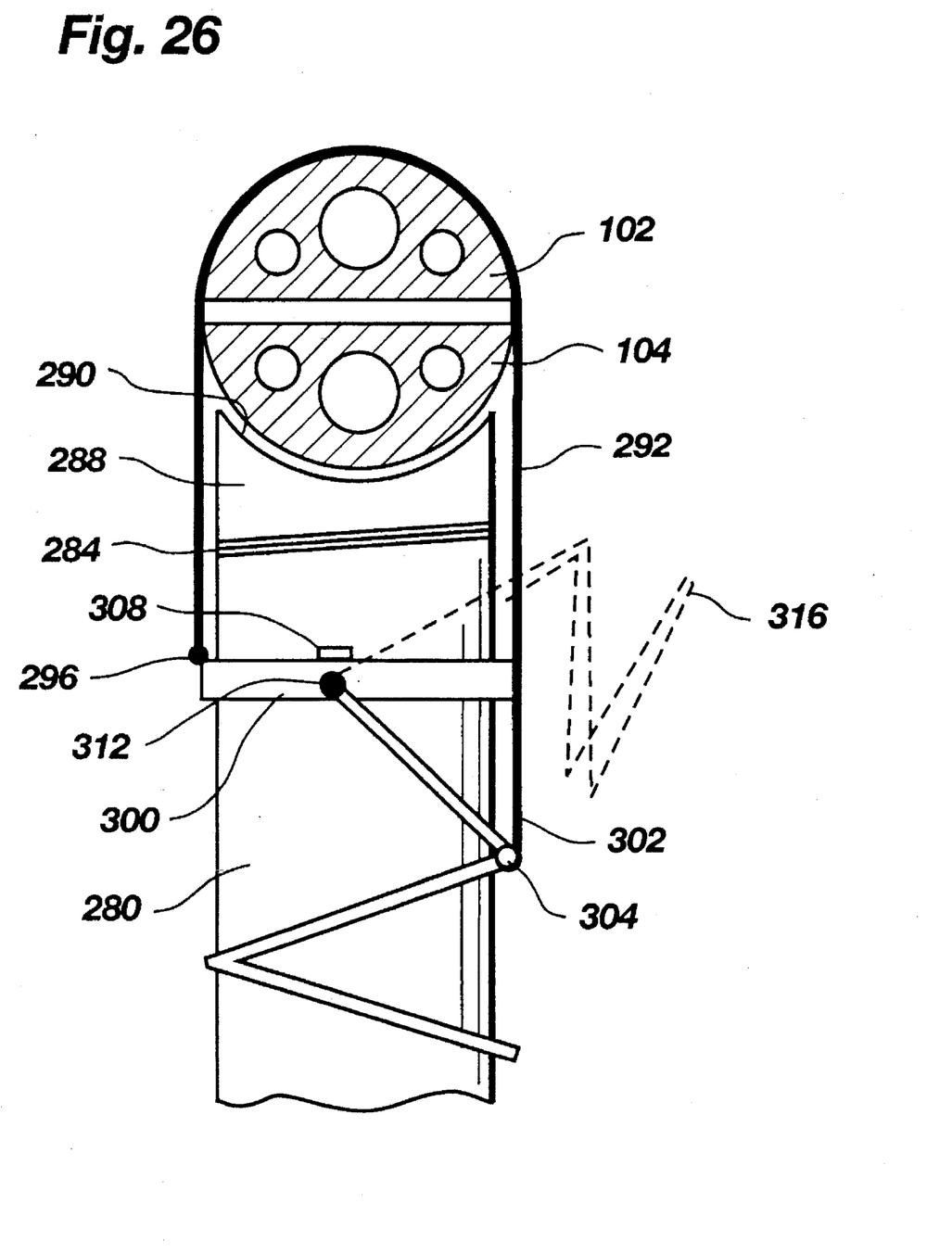
FIG. 26 is a side elevational view of another embodiment of a seat/post attachment apparatus using a quick release system similar to that shown in FIG. 22.

Referring now to FIG. 26, there is shown an additional quick release embodiment incorporating the principles of the present invention. The seat/post apparatus, generally indicated at 278, includes a seat post 280 which has threads 284 engaged with the threads (not shown) disposed inside a rotatable jam washer 288. Rotation of the jam washer 288 about the seat post 280 enable the height of the concave portion 290 of the jam washer 288 to be raised or lowered as the respective threads of the seat post 280 and jam washer 284 interact. A pair of clamps 102 and 104, similar to those shown in FIG. 22, rest in the concave portion 290 of the jam washer 288. The clamps 102 and 104 are held in place by a band 292, which is connected at a first end 296 to a collar 300. The band 292 is attached at a second end 302 to a clip 304 in the same was as explained relative to clip 212 in FIGS. 22–22B. The collar 300, is rotatable about the seat post 280 so as to enable the jam washer 288, the clamps 102 and 104, the band 292, and the clip 304 to rotate about the seat post. By rotating these structures in unison, the jam washer 288 will increase or decrease the height of the clamps 102 and 104, relative to the seat post 280, to thereby further tighten or loosen the band 292. The collar 300 is held in place by a retention pin 308, so that it may not move upwardly or downwardly in conjunction with the jam washer 288.

In order to release the clamps 102 and 104, the clip 304 is rotated about a pivot point 312 on the collar so as to swing away from the seat post 280 as represented by the dashed FIG. 316. Once the desired adjustments to the clamps 102 and 104 have been made, the clip 304 is returned to its original position where it prevents the clamps 102 and 104 firmly in place. Should additional adjustments be needed, the clip 304, the collar 300, the band 292, and the clamps 102 and 104, and the jam washer 288 are rotated about the seat post 280 so as to either raise or lower the jam washer, thereby tightening or loosening the band 292.

I claim:

1. Seat attachment apparatus, adapted for use with a seat including an attachment member, comprising:

a housing;

an elongate seat post having first and second ends, the first end being engaged with and adapted for rotational movement within the housing;

means for moving the seat post through the housing in a direction into or out of the housing when the seat post is rotated relative to the housing;

a clamp assembly, adapted for selective engagement of the attachment member, disposed within the housing; and a connector selectively connecting the seat post to the clamp assembly such that the movement of the seat post relative to the housing causes the clamp assembly selectively to engage and disengage the attachment member.

2. The apparatus of claim 1 wherein the seat post pushes against the clamp assembly when the seat post is moved in a first direction through the housing and whereby the seat post ceases to push against the clamp assembly when the seat post is moved in a second direction through the housing.

3. The apparatus of claim 2 wherein the connector comprises a block disposed between the first end of the seat post and the clamp assembly.

4. The apparatus of claim 2 wherein the connector comprises a wedge, a first side of which is disposed adjacent the first end of the seat post and a second side of which is disposed adjacent the clamp assembly.

5. The apparatus of claim 2 wherein the clamp assembly is at least partially offset from the axis of the seat post, and wherein the connector comprises an elongate lever having a first end anchored in the housing and a second end extending adjacent the seat post, whereby the movement of the seat post through the housing selectively urges the lever against the clamp assembly.

6. The apparatus of claim 1, wherein the apparatus further comprises locking means disposed adjacent the first end of the seat post for selectively preventing rotation of the seat post relative to the housing.

7. The apparatus of claim 6, wherein the locking means is formed integrally with the housing.

8. The apparatus of claim 7, wherein the locking means further comprises a bolt connecting two spaced portions of the housing such that rotation of the bolt in one direction forces the spaced portions closer together, thereby preventing rotation of the seat post relative to the housing, and rotation of the bolt in an opposite direction forces the spaced portions of the housing further apart, thereby enabling rotation of the seat post relative to the housing.

9. The apparatus of claim 7 wherein the locking means comprises a quick release connector.

10. The apparatus of claim 6, wherein the locking means comprises a set screw extending at least partially through the housing so as to prevent rotation of housing about the seat post.

11. The apparatus of claim 6, wherein the locking means comprises a nut disposed adjacent the housing and about the seat post.

12. Seat attachment apparatus, the seat having an attachment member, comprising:

a housing including a first arm and a second arm oriented adjacent each other, each arm having a proximal end and a distal end, the arms being joined at their proximal ends, each arm having an interior surface disposed adjacent the interior surface of the other arm and an exterior surface disposed substantially opposite the interior surface;

a clamp assembly for selective engagement of the attachment member disposed between the arms;

an elongate seat post with first and second ends, the first end extending through the arms at a location between the clamp assembly and the distal ends of the arms, the seat post being adapted for rotational movement within and relative to the arms; and urging means, operatively connecting the seat post and the arms, for selectively urging the arms together when the seat post is rotated relative to the arms in a first direction and ceasing to urge the arms together when the seat post is rotated relative to the arms in a second direction.

13. The apparatus of claim 12 wherein the seat post is substantially cylindrical, the first end of the seat post is adapted for threaded engagement with the first arm, and the seat post is adapted for sliding engagement with the second arm, and further comprising a protrusion extending from the side of the seat post adjacent the exterior surface of the second arm when the first end of the seat post and the first arm are in threaded engagement.

14. The apparatus of claim 12 wherein the seat post is substantially cylindrical, and further comprising a bolt comprising a head and a body, the head being disposed adjacent the exterior surface of the first arm and the body extending into the seat post, and a rod disposed through the seat post, substantially perpendicular to the seat post, the rod being adjacent the exterior surface of the second arm and in threaded engagement with the body of the bolt.

15. Apparatus for attachment to a seat, the seat having an attachment member, comprising:

an elongate seat post having a first end and a second end;

an opposer having a head and a body, the body being rotatably attached to the seat post and the head being spaced from the first end of the seat post;

means for decreasing the distance between the first end of the seat post and the head of the opposer when the opposer is rotated relative to the seat post in a first direction, and for increasing the distance between the first end of the seat post and the head of the opposer when the opposer is rotated relative to the seat post in a second direction;

a clamp assembly, for selective engagement of the attachment member, disposed substantially between the first end of the seat post and the head of the opposer, the clamp assembly being disposed such that rotation of the clamp assembly relative to the seat post in said first direction rotates the opposer in said first direction and rotation of the clamp assembly relative to the seat post in said second direction rotates the opposer in said second direction;

whereby the clamp assembly is tightened when the opposer is rotated relative to the seat post in said first direction and loosened when the opposer is rotated relative to the seat post in said second direction.

16. The apparatus of claim 15 further comprising locking means for selectively preventing rotation of the body about the seat post.

17. The apparatus of claim 15 further comprising a block disposed between the first end of the seat post and the clamp assembly.

18. The apparatus of claim 15 wherein the seat post comprises a rod extending laterally therethrough and the opposer comprises a bolt, the body of the bolt being in threaded engagement with the rod, and the clamp assembly being disposed between the first end of the seat post and the head of the bolt.

19. The apparatus of claim 15 wherein the opposer is a bolt extending into the seat post and threadedly engaged therewith.

20. The apparatus of claim 15 wherein the clamp assembly comprises a hemispherical clamp disposed on the top of the seat post and adapted for tilting movement relative thereto.

21. The apparatus of claim 18 wherein the clamp assembly comprises first and second clamps, each of half-cylindrical shape with a curved side and a flat side, adapted to tighten the attachment member between opposing grooves formed in the flat sides thereof, and wherein the body of the bolt extends through slots disposed through the clamps and the head of the bolt contacts the first clamp in a depression formed in the curved surface of the first clamp, and further comprising a cradle disposed between the second clamp and the first end of the seat post such that the clamps can be rotated to a predetermined extent on an axis substantially transverse to the axis of the seat post.

22. The apparatus of claim 15 wherein the opposer comprises a housing disposed substantially around the clamp assembly, the seat post being threadedly engaged with a portion of the housing, the body of the housing being the portion engaged with the seat post and the head of the housing being the portion of the housing opposite the seat post, and further comprising a block disposed between the first end of the seat post and the clamp assembly, and wherein the clamp assembly is substantially cylindrical and rotatable within the housing when the clamp assembly is loosened.

23. The apparatus of claim 15 wherein the head of the opposer comprises a flexible band disposed around the clamp assembly and the body of the opposer comprises a bolt fixedly attached to the band and threadedly engaged with the seat post.

24. The apparatus of claim 15, wherein the apparatus further comprises locking means to prevent rotation of the opposer selectively.

25. Seat attachment apparatus for use with a bicycle frame, the seat including an attachment member, comprising:

a seat post comprising first and second arms, each arm having distal and proximal ends, the arms being joined at their proximal ends and defining a cavity near their proximal ends when in a closed position, the seat post being nestable in the frame of the bicycle;

clamp assembly, for selective engagement of the attachment member, disposed within said cavity;

holding means for selectively locking the arms in said closed position, the holding means being disposed between the frame of the bicycle and the clamp assembly.

26. The apparatus of claim 25 wherein the holding means comprises a collar disposed around the arms in the closed position.

27. Seat attachment apparatus for use with a bicycle frame, the seat including an attachment member, comprising:

a seat post comprising first and second arms, each arm having distal and proximal ends, the arms being joined at their proximal ends and defining a cavity near their proximal ends when in a closed position, the seat post being nestable in the frame of the bicycle;

clamp assembly, for selective engagement of the attachment member, disposed holding means for selectively locking the arms in said closed position, the ted.

28. Seat attachment apparatus, adapted for use with a seat including an attachment member, comprising;

a clamp assembly, adapted for selective engagement of the attachment member, an elongate seat post having first and second ends, the first end being disposed adjacent the clamp assembly, and pivotal clip means for selectively securing the clamp assembly adjacent to the elongate seat post so as to hold the seat in a fixed position.

29. The apparatus of claim 28, wherein the clip assembly comprises a clip pivotally attached to the seat post and a band extending from the one side of the seat post, around the clamp assembly to an attachment with the clip, such that rotation of the clip downwardly toward the seat post causes the band to tighten around the clamp assembly.

30. The apparatus of claim 28, further comprising adjustment means disposed between the clamp assembly and the elongate seat post for adjusting the height of the clamp assembly relative to the elongate seat post when the elongate seat post is rotated relative to the clamp assembly.

31. The apparatus of claim 28, wherein the elongate seat post comprises a plurality of threads, and wherein the adjustment means comprises a threaded jam washer disposed about the threads of the elongate seat post such that rotation of the elongate seat post within the jam washer causes a change in the position of the jam washer relative to the elongate seat post.

32. The apparatus of claim 28, further comprising a collar rotatable about the elongate seat post, the pivotal clip means being pivotally attached to the collar so as to enable rotation of the pivotal clip means about the elongate seat post.

33. Seat attachment apparatus, adapted for use with a seat including an attachment member, the apparatus comprising:

moveable clamp means for selectively holding the attachment member of the seat so as to hold the seat in a set position;

housing means disposed at least partially about the movable clamp means and having an interior portion for holding the clamp means such that selectively forcing the clamp means into contact with the interior portion of the housing prevents the clamp means from moving; and rotatable adjustment means for selectively forcing the movable clamp into contact with an interior portion of the housing so as to prevent movement of the clamp, said rotatable adjustment means comprising a seat post.

34. The seat attachment apparatus of claim 33, further comprising an elongate seat post rotatably coupled to said housing.

35. The seat attachment apparatus of claim 33, further comprising a contact block disposed at least partially within the housing adjacent the clamp means for preventing movements of the clamp means.

36. The seat attachment apparatus of claim 35, wherein the contact block is moved into forceful contact with the clamp means by rotation of the adjustment means.

37. The seat attachment apparatus of claim 33, wherein the interior portion of the housing has a plurality of grooves for limiting movement of the clamp.

38. Seat attachment apparatus for attaching a seat to a seat post, adapted for use with a seat including an attachment member, the apparatus comprising:

moveable clamp means disposed adjacent the seat post for selectively holding the attachment member of the seat so as to hold the seat in a set position;

housing means disposed at least partially about the movable clamp means and having an interior portion for holding the clamp means such that selectively forcing the clamp means into contact with the interior portion of the housing prevents the clamp means from moving; and rotatable adjustment means for selectively forcing the movable clamp into contact with an interior portion of the housing so as to prevent movement of the clamp, the adjustment means comprising a collar rotatable about the seat post.

39. The seat attachment apparatus of claim 38, wherein the seat post is coupled to said housing.

40. The seat attachment apparatus of claim 38, further comprising a contact block disposed at least partially within the housing adjacent the clamp means for preventing movement of the clamp means.

* * * * *

UNITED STATES PATENT AND TRADEMARK OFFICE
CERTIFICATE OF CORRECTION

PATENT NO. : 5,509,751
DATED : April 23, 1996
INVENTOR(S) : Jeff Keller

It is certified that error appears in the above-indentified patent and that said Letters Patent is hereby corrected as shown below:

Claim 27, Column 16, Line 40, after the word "disposed" please insert --within said cavity--.

Claim 27, Column 16, Line 42, please delete the word "ted" and insert --the holding means comprising the bicycle frame in which the seat post is inserted--.

Signed and Sealed this

Twenty-sixth Day of August, 1997

Attest:

BRUCE LEHMAN

Attesting Officer

Commissioner of Patents and Trademarks